US 8,056,249 B1

(12) United States Patent
Morrissey

(10) Patent No.: US 8,056,249 B1
(45) Date of Patent: *Nov. 15, 2011

(54) APPARATUS AND METHODS FOR LEVEL AND/OR STRAIGHT EDGE TOOLS

(75) Inventor: Michael D. Morrissey, Southington, CT (US)

(73) Assignee: Exceptional IP, LLC

( * ) Notice: Subject to any disclaimer, the term of this patent is extended or adjusted under 35 U.S.C. 154(b) by 0 days.

This patent is subject to a terminal disclaimer.

(21) Appl. No.: 12/562,117

(22) Filed: Sep. 17, 2009

Related U.S. Application Data

(63) Continuation of application No. 12/168,144, filed on Jul. 6, 2008, now Pat. No. 7,607,235, and a continuation of application No. 11/408,176, filed on Apr. 21, 2006, now Pat. No. 7,409,772.

(60) Provisional application No. 60/673,811, filed on Apr. 22, 2005.

(51) Int. Cl.
*G01C 9/24* (2006.01)

(52) U.S. Cl. .......................................... 33/451; 33/365

(58) Field of Classification Search ..................... 33/451
See application file for complete search history.

(56) References Cited

U.S. PATENT DOCUMENTS

| 3,921,306 | A | 11/1975 | Provi | 33/379 |
| 3,934,352 | A | 1/1976 | Quenot | 33/111 |
| D308,644 | S | 6/1990 | Butler et al. | D10/69 |
| 5,134,780 | A | 8/1992 | Butler et al. | 33/366 |
| D330,682 | S | 11/1992 | Butler et al. | D10/69 |
| 6,332,301 | B1 | 12/2001 | Goldzak | 52/729.2 |
| 6,658,752 | B1 | 12/2003 | Bonaventura, Jr. | 33/374 |
| 6,694,632 | B1 | 2/2004 | Schooley | 33/374 |
| 6,807,743 | B2 | 10/2004 | Odachowski | 33/465 |
| 6,839,974 | B1 * | 1/2005 | Hitchcock | 33/473 |
| 7,204,029 | B2 | 4/2007 | Tran et al. | 33/451 |
| 7,409,772 | B1 * | 8/2008 | Morrissey | 33/451 |
| 7,607,235 | B1 * | 10/2009 | Morrissey | 33/451 |

* cited by examiner

*Primary Examiner* — Christopher Fulton
(74) *Attorney, Agent, or Firm* — Wolff Law Offices, PLLC; Kevin Alan Wolff

(57) ABSTRACT

The present invention is directed generally to tools that are lightweight, high quality, durable, rigid and strong. For example, various tools used to level items and/or as a straight edge for aligning or drawing lines on items may be designed in an improved or augmented I beam style so that they are lightweight, strong, durable and rigid so as to hold their shape under stress or return to their original shape after being stressed. In various exemplary embodiments, the I beam style level and/or straight edge may have a first main elongated side to which two elongated perpendicular sides are connected or coupled. At least one or more higher strength elongated sides, for example a second elongate side, may be comprised of a closed or box shaped side. For example, the second elongated side may be, for example, a box shaped construction.

20 Claims, 14 Drawing Sheets

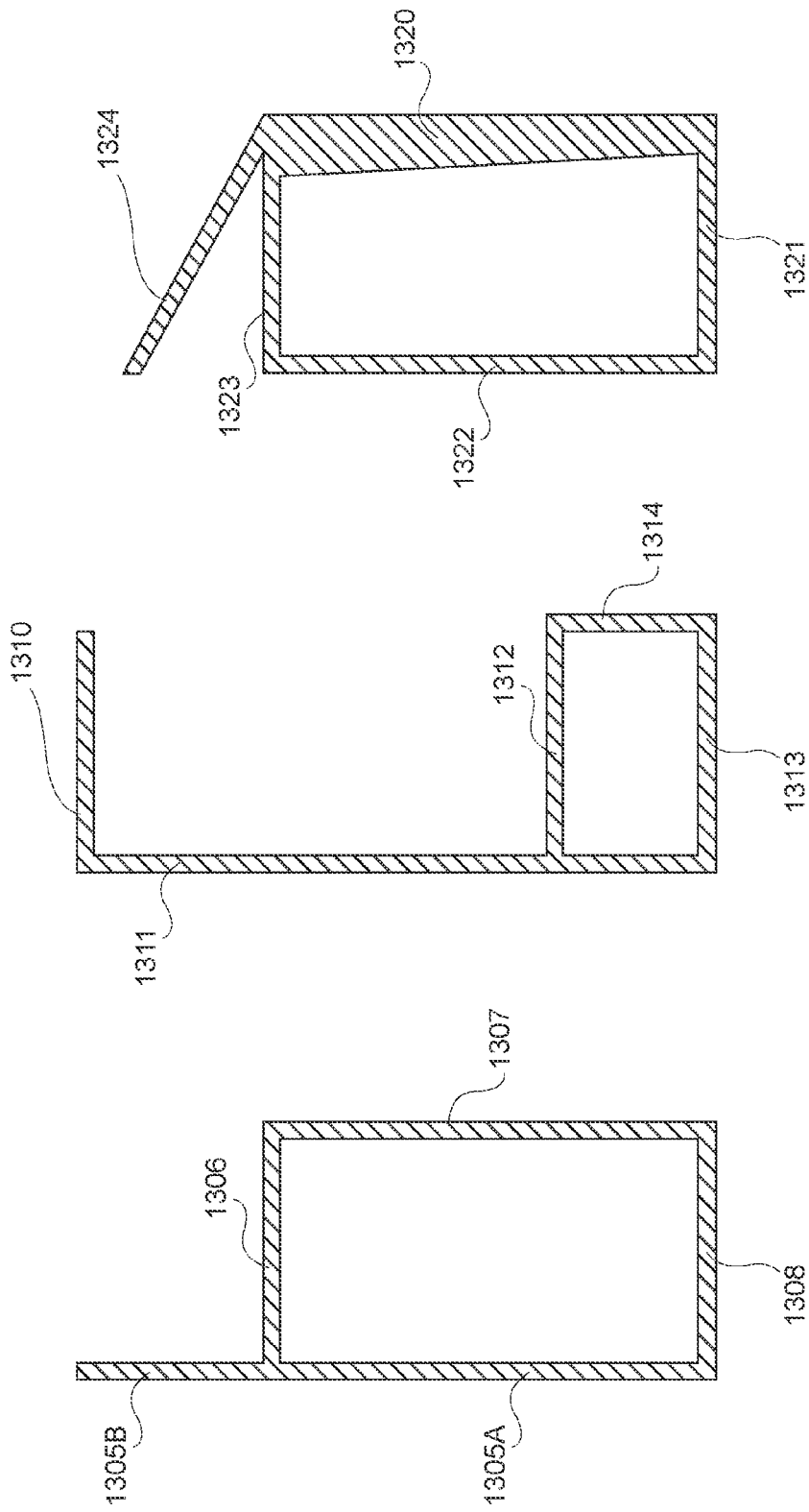

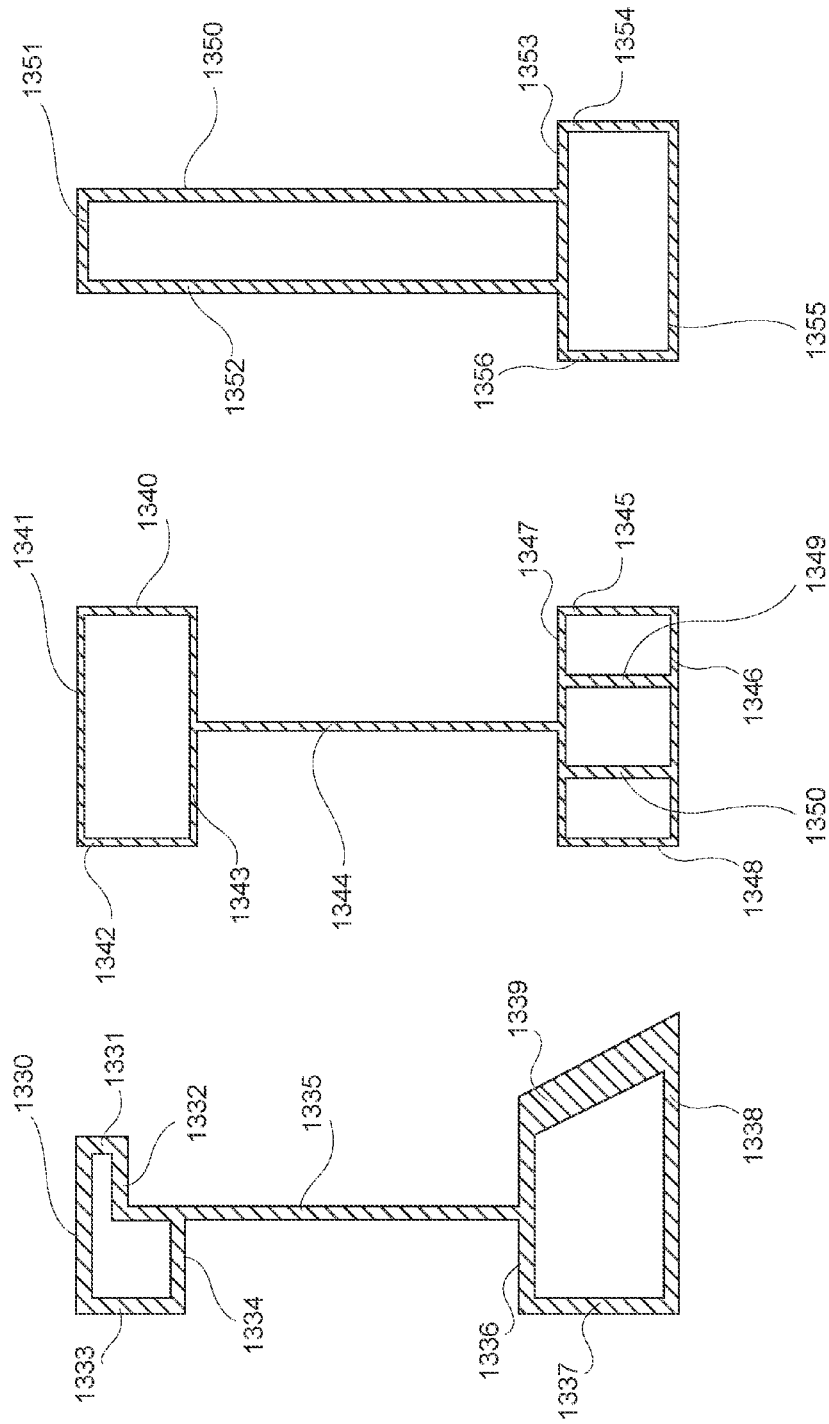

APPARATUS AND METHODS FOR LEVEL AND/OR STRAIGHT EDGE TOOLS

This application claims priority to, and is a continuation of, U.S. patent application Ser. No. 12/168,144, filed on Jul. 6, 2008, now U.S. Pat. No. 7,607,235. U.S. patent application Ser. No. 11/408,176, filed on Apr. 21, 2006, now U.S. Pat. No. 7,409,772, which claims benefit of U.S. Provisional Patent Application No. 60/673,811, filed Apr. 22, 2005. These prior patent applications are hereby incorporated by reference for all purposes.

FIELD OF THE INVENTION

The present invention pertains to methods and various apparatus for tools. For example, the invention involves various apparatus and methods for high strength and durability level and/or straight edge tools.

BACKGROUND

Various levels and straight edge tools have been known in the past for determining whether an item is level and assisting in leveling an item and/or drawing a straight edge in, for example, the building trades. Of the various types of levels, there are generally two types of levels available for use in the building industry; box style and "I" beam style levels. The box style level is, as its name implies, shaped like a rectangular box having four sides formed in an elongated manner with the level indicators or bubble vials encased within the box shape. The I beam style level is, as its name implies, shaped like an I beam having only three main features or "sides" formed in an elongated manner, with a first main side to which the second and third main sides are attached at opposite ends (of the first main side) and are perpendicular with the first main side, so that from a cross section view the level generally has an "I" shape. These same shapes may be commonly used for a straight edge as well as for establishing "level" geometry.

These tools may often be used in the building trades. As such, a level and/or straight edge used in the building trades may be subjected to various adverse conditions including, being stepped upon by a worker, being thrown down hard, being dropped from high places, being transported in the bed or a pickup truck, being left out in the weather, etc. Thus, they must exhibit various characteristics, for example, strength, rigidity, durability, consistent and repeatable accuracy. It is also desirable that these products be light in weight, etc.

In general, a box level may be stronger and more ridged than an I beam style level, but it is typically heavier in weight than an I beam style. An I beam level and/or straight edge may not be strong or rigid enough and may be too flimsy such that it may be bent or rendered not true or flat by heavy impact or torque. For example, the typical I beam style level and/or straight edge may be twisted about its elongated axis because the design has very little strength in this direction, particularly when it is made of lightweight materials such as aluminum or plastic in thin sections.

To be consistently true at determining whether a working surface or item is level or for determining or creating a straight line, a level and/or straight edge must be rigid enough so that a reasonable amount of abuse and heavy impact or excessive torque, that the level or straight edge device receives, does not permanently distort it and rendering it unable to function properly. In the case of I beam style level and/or straight edge made of lightweight materials in thin sections, the product will not be as strong as desired. However it will be lower in weight and cost. In the past, the box level was better for strength and rigidity, but the cost to manufacture and weight were higher than I beam style levels and/or straight edges.

Therefore, a level and/or straight edge having improved cost and/or lower weight over the box style with similar, comparable or better durability, strength and rigidity to the box style would be desirable and prove particularly useful in the building trades.

SUMMARY

The present invention is directed generally to tools that are lightweight, high quality, durable, rigid and strong. For example, various tools used to level items and/or as a straight edge for aligning or drawing lines on items may be designed so that one or more of the sides are designed to be stronger or higher strength than one or more of the other sides, so as to give the device more strength and/or rigidity. In one embodiment, the device may be a level and/or straight edge device having an improved or augmented I beam style so that they are lightweight, strong, durable and rigid so as to hold their shape under stress and after being stressed. The invention is particularly useful for levels and/or straight edge tools used in the building trades, for example, a carpenter level and/or straight edge.

In various exemplary embodiments, the I beam style level and/or straight edge may have a first main elongated side to which two elongated perpendicular sides are connected or coupled. However, at least one or more higher strength elongated sides, for example a second elongate side, may be comprised of a closed or box shaped side that is attached to the first main elongated side in, for example, a perpendicular orientation thereto. For example, the second elongated side may be, for example, a box shaped construction. The box shaped side may be larger than the typical side and may be, for example, hollow, contain strengthening walls, or be made of a solid material. The box shape construction may add additional strength and rigidity so that the I beam style level and/or straight edge may retain its true shape even when dropped, stressed and/or twisted about its horizontal axis, independent of it being made from lightweight and/or more flexible materials such as aluminum, magnesium, plastic, wood, etc. In one variation, the I beam style level and/or straight edge may be designed so that the sides are integrally formed and may be formed using, for example, an extrusion process. In another variation, one of the perpendicular sides may be open and the other perpendicular side may be closed.

In another exemplary embodiment, the I beam style level and/or straight edge may have one or more perpendicular members or sides that increase the strength and/or rigidity but are made of a different shape. For example, the I beam style level and/or straight edge may have a concave surface on one or more sides of a box type structure. In another variation, the support or strengthening side may be in the shape of a triangle. The triangle may be hollow or include one or more strengthening walls within it.

In a still further exemplary embodiment, the I beam style level and/or straight edge may have a typical structure including a first main elongated side to which second perpendicular elongated side and a third perpendicular elongated side are connected. An elongated strengthening member may be attached along the planar surface of one or both of the second perpendicular elongated side and a third perpendicular elongated side.

In even further embodiments, the level items and/or straight edge device may have other geometrical shapes that provide improved rigidity without necessarily having strictly an I beam construction. For example, the device may have a cross section that is shaped like a "g" or "P." Both ends of the structure may be closed. Further, the embodiments may have varying geometry features including non rectangular features, non-uniform wall thicknesses, etc.

As should be appreciated, although additional exemplary embodiments and variations of the invention are provided in the Detailed Description section below, neither this Summary nor the Detailed Description section below contain all possible embodiments or variations of the present invention.

BRIEF DESCRIPTION OF THE DRAWINGS

Some of the objects, features and advantages of the present invention will become more readily apparent to those skilled in the art upon reading the following detailed description, in conjunction with the appended drawings, in which:

FIGS. 13A-13F illustrates several cross-section variations (or end view without end caps) which exemplifies some of the range of alternative embodiments of the invention.

DETAILED DESCRIPTION

The present invention is directed generally to tools that may be lighter in weight, stronger, more rigid and more durable than those presently available. As such, the present invention includes various embodiments showing devices and methods for various tools that may, at least in part, include a side strengthening member. For example, an I beam style level and/or straight edge may have a first main elongated side to which two elongated perpendicular sides are connected or coupled. In various embodiments, at least one or more higher strength structures are used to augment one or more of the perpendicular elongated sides. The invention may be particularly beneficial to building tools such as levels and/or straight edges that need to maintain their original shape, planarity and squared sides orientation (all sides at right angles to one another and the surfaces flat).

Figure 1:
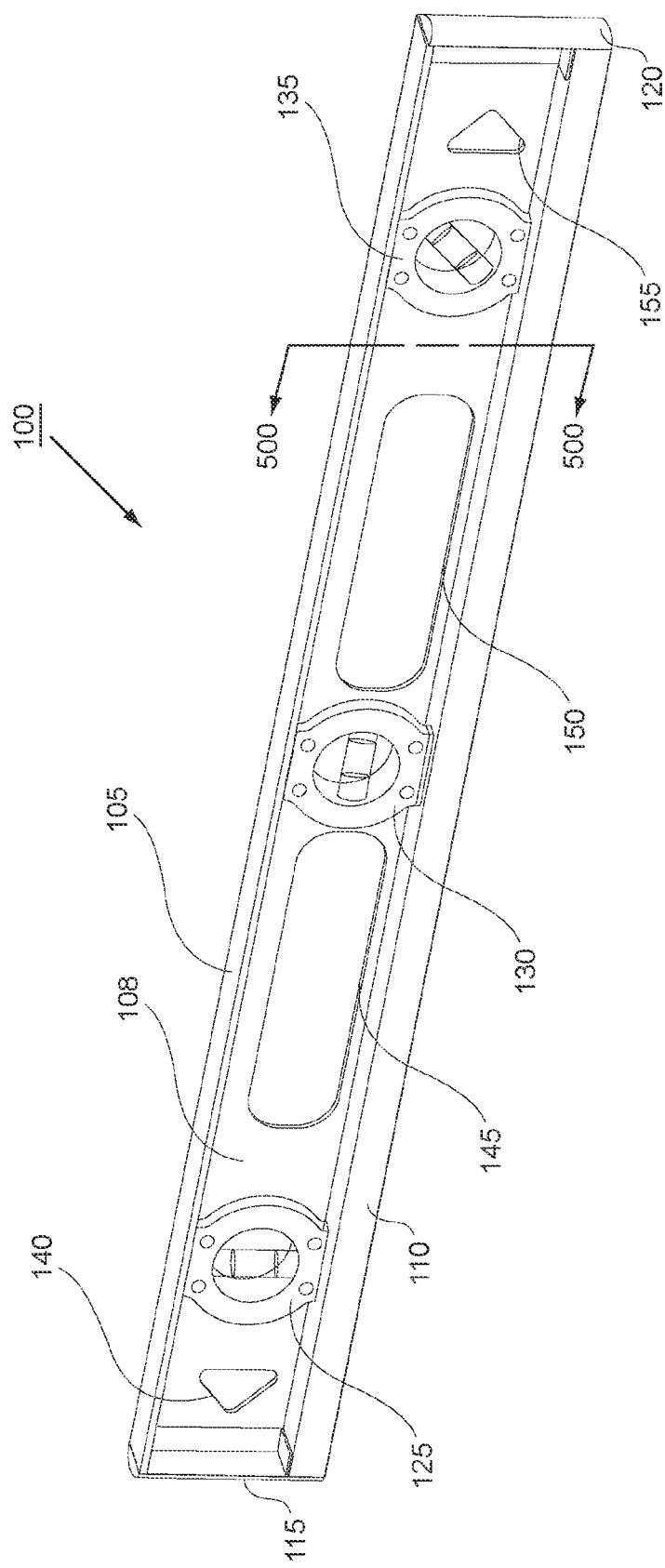
FIG. 1 illustrates a perspective view of a level and/or straight edge, according to at least one exemplary embodiment of the invention.

Referring to FIGS. 1-5, an I beam style level and/or straight edge according to at least one exemplary embodiment of the invention is presented. FIG. 1 shows a perspective view of the I beam style level and/or straight edge 100. The I beam style level and/or straight edge 100 may be a three level indicator or level vial design having a frame that may include, for example, a top elongated bar 105 formed perpendicular with and connected to a first end of main frame side 108. The main frame side 108 may also be formed with or connected at a second end (e.g., a bottom end) to, for example, a closed structure such as box structure 110, and oriented generally perpendicular to the orientation of the main frame side 108. The main frame side 108 may also house one or more level indicators or vials, for example, the level indicators or level vials 125, 130, and 135, which may be the mounted in a vertical, horizontal, and 45 degree angle, respectively to the horizontal axis of the I beam style level and/or straight edge 100. The main frame side 108 may also include various holes or cut outs therein, 140, 145, 150, 155, that may be used for reducing weight, hanging the I beam style level and/or straight edge 100, or grasping/handling of the I beam style level and/or straight edge 100. The I beam style level and/or straight edge 100 may also include end cap 115 and end cap 120 at the far ends of the beam frame. These end caps 115 and 120 may be pressed, screwed, snapped, or glued onto the ends of the beam.

The I beam styled structure including the top elongated bar 105, main frame side 108, and box structure 110 may be formed integrally together using, for example, an extrusion process that extrudes a continuously integral beam. The extruded beam may then be cut to length. Although any length may be possible, some exemplary lengths may include 1 foot, 2 foot, 4 foot, etc. Alternatively, the I beam style shape may be formed by mounting the three sides together using, for example, brazing or welding. The I beam style structure may be made of a lightweight yet strong material, for example, a metal such as aluminum, magnesium, or any other material that may be extruded and maintain a squared I beam shape. One alternative material may include various types of plastics. Once the solid beam is formed, the holes or cut outs therein, 140, 145, 150, 155, may be formed by, for example, a punching or cutting operation. Then, the level indicators or level vials 125, 130, and 135 may be attached to the main frame side 108. Finally, the end caps 115 and 120 may attached onto the ends of the I beam style structure as described previously.

Figure 2:
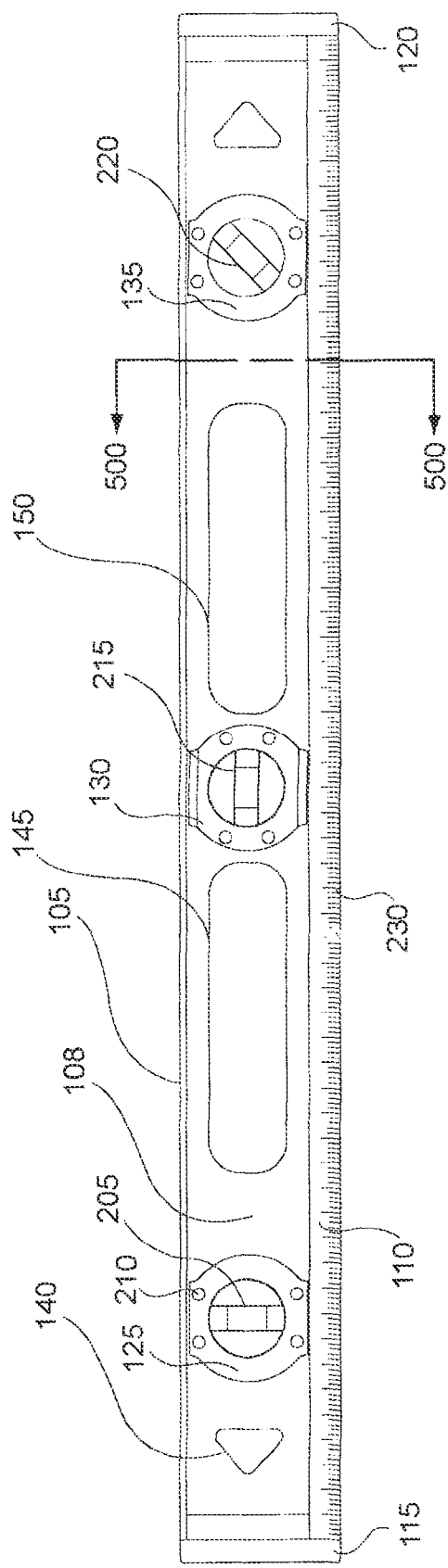
FIG. 2 illustrates a side view of the level and/or straight edge shown in FIG. 1, according to at least one exemplary embodiment of the invention.

Referring now to FIG. 2, a side view of the I beam level and/or straight edge 100 according to at least one embodiment is shown. As indicated above, the main frame side 108 may also house one or more level indicators or vials, for example, the level indicators or level vials 125, 130, and 135. The level indicators or level vials 125, 130, and 135 may include vials of liquid with a gas bubble floating therein and alignment windows 205, 215 and 220. The vials may be mounted within a casing made of, for example, plastic. The plastic casing may have two halves (one on each opposing sides of the main frame 108) that may be coupled, mounted or connected to the main frame side 108 using, for example, mounting screws 210, rivets, or other type of fasteners. Alternatively, they may be adhesively attached thereto. In any case, the level indicators or level vials 125, 130, and 135 may be the mounted in a vertical, horizontal, and 45 degree angle, respectively to the horizontal axis of the I beam style level and/or straight edge 100.

As may be seen more clearly from FIG. 2, the top elongated bar 105 may be thin relative to the thickness of box structure 110. The top elongated bar 105 may be of a thickness typically found on I beam levels and/or straight edges. However, box structure 110 may be thicker, for example 2 to 5 times as thick as top elongated bar 105, to add additional strength and rigidity so that the I beam style level and/or straight edge 100 will retain its original squared off shape if it is stressed or twisted about the horizontal axis.

Figure 3:
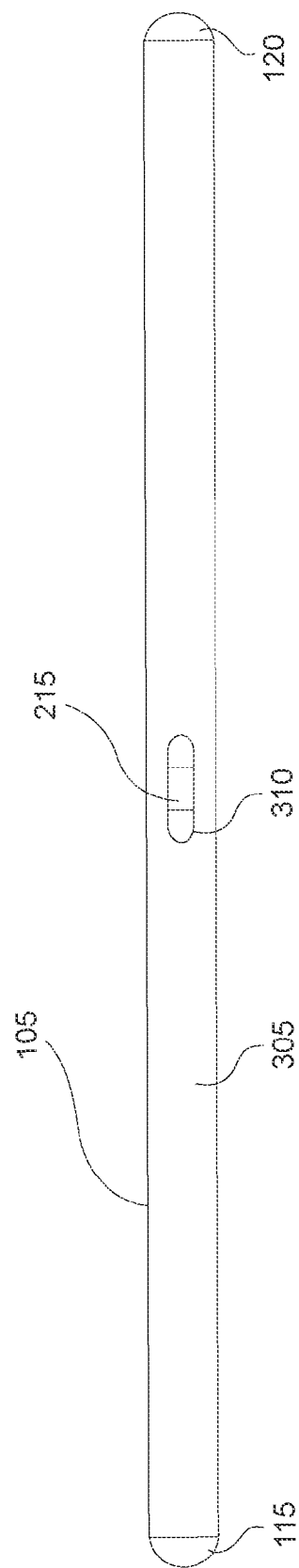
FIG. 3 illustrates a top view of the level and/or straight edge shown in FIG. 1, according to at least one exemplary embodiment of the invention.
Figure 4:
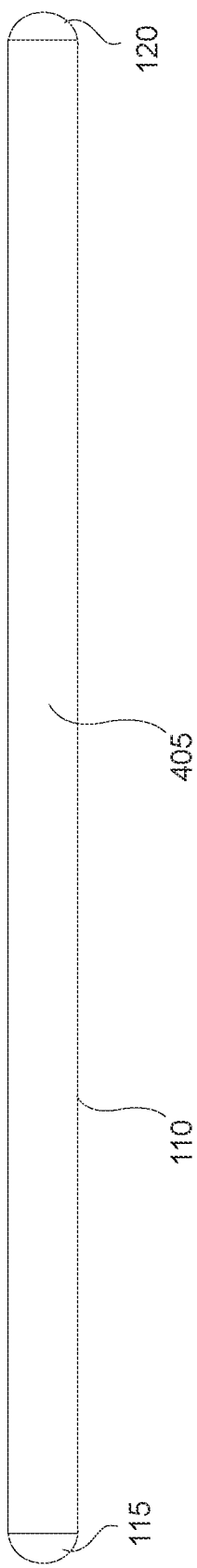
FIG. 4 illustrates a bottom view of the level and/or straight edge shown in FIG. 1, according to at least one exemplary embodiment of the invention.

Referring now to FIGS. 3 and 4, a top view and bottom view of the I beam style level and/or straight edge 100 according to at least one embodiment is shown. The top elongated bar 105 may include, for example, a flat surface 305 for placing on a working surface to determine if it is level or to be used as a straight edge. The flat surface 305 or/and 405 may include a viewing window 310 or/and 410, in either one or both of flat surface 305 or/and 405 for viewing the level indicator or level vial 215 so as to determine if a surface or working piece is level. The flat surface may be smooth or textured. As can be seen, the end caps 115 and 120 may be, for example, rounded or convex in shape. Alternatively, the end caps 115 and 120 may be squared off or eliminated altogether.

Referring now to FIG. 4, a bottom view of the level and/or straight edge 100 is shown, according to at least one exemplary embodiment of the invention. The closed or box structure 110 has a flat surface 405 for placing on a working surface to determine if the work surface is level and/or flat, or for using as a straight edge.

Figure 5:
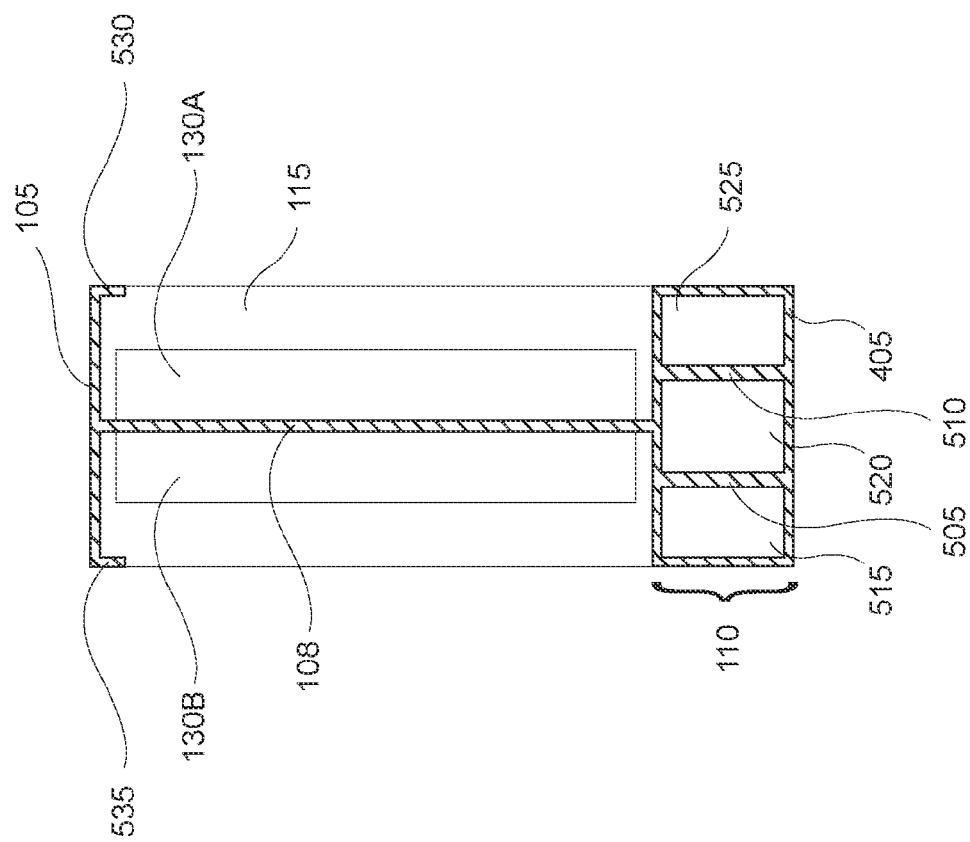
FIG. 5 illustrates a cross-section view of the level and/or straight edge shown in FIG. 1, according to at least one exemplary embodiment of the invention.

Referring now to FIG. 5, a cross-section view of the level and/or straight edge taken across the line 5-5 of FIGS. 1 and 2 is shown, according to at least one exemplary embodiment of the invention. The top elongated bar 105 is formed perpendicular to main frame side or bar 108 and may have short ears 530 and 535 that are parallel with main frame side or bar 108. The ears 530 and 535 may add rigidity to the structure. Two halves of the level indicator or level vial 130, side 130A and side 130B, are attached to opposite sides of main frame side or bar 108. End cap 115 closes off the far end of the I beam structure. The closed or box structure 110 may have, for example, four sides that form a rectangle that adds strength and/or rigidity to the typical simple I beam structure. The closed or box structure 110 may be the same width as the top elongated bar 105. The closed or box structure 110 height may also be greater than the height of top elongated bar 105. In fact, in various embodiments, the thickness of the top wall of closed or box structure 110 (as well as the other walls) may be the same thickness as the top elongated bar 105 and/or the main frame side or bar 108 so as to keep the weight as light as possible. For example, the thickness may be, for example, in a range of approximately 1/32 to 1/8 of an inch. In any case, the closed or box structure 110 may include one or more internal strengthening walls, for example, walls 505 and 510, and hollow areas 515, 520 and 525. Using the internal support walls 505 and 510 along with the hollow areas 515, 520, and 525, in the box structure 110 may increase the strength and rigidity while keeping the device lighter weight. The bottom surface or wall 405 may be flat in this exemplary embodiment and the thickness of all the walls of the closed or box structure 110 may, but need not be approximately the same.

Figure 6:
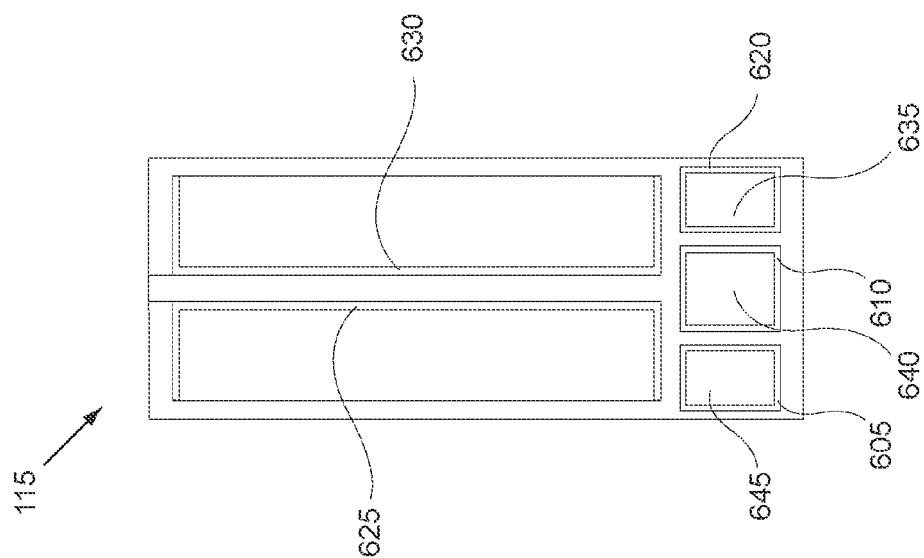
FIG. 6 illustrates an inside view of an end cap for the level and/or straight edge shown in FIG. 1, according to at least one exemplary embodiment of the invention.

Referring now to FIG. 6, an inside view of an end cap, for example end cap 115, for the level and/or straight edge is shown, according to at least one exemplary embodiment of the invention. The end cap 115 may be designed to fit snuggly to the I beam style structure. For example, walls 625 and 630 may be formed of a shape and at a distance apart so as to fit snuggly to the I shape of the elongated bar 105, main frame side or bar 108, and top wall of the box structure 110. Further, three boxes 605, 610 and 620 may be formed to fit snuggly within the hollow areas 515, 520, and 525, of the closed or box structure 110. The three boxes 605, 610 and 620 may themselves be hollow having voids 635, 640 and 645. The end cap 115 may be made of a lightweight and durable material including, for example, plastic, that may be molded and/or cut to shape. In one variation the end caps 115 and 120 may be adhesively attached. In one variation the end caps may be eliminated or replaced with plugs made of plastic or rubber to plug the holes in the closed or box structure.

Although not illustrated above, the side surfaces or bottom surface of the closed or box surface may include one or more scales that runs lengthwise for the I beam level and/or straight edge 100. The scale(s) may be in English and/or Metric gauge and be used for measuring. The scale(s) may be, for example, screen printed or etched into the surface of the sides. Further, the surfaces 305 and 405 may be smooth or textured. The textured surface may be formed on the surface or by a coating, for example, a rubber or plastic coating. Further, although this embodiment shows the closed or box structure used as only one end of the I beam shaped level and/or straight edge 100, this closed or box structure may be used on both ends of the main frame side or bar 108, rather than using elongated bar 105. In either case, using either one or two closed or box shapes will increase the rigidity of the structure and reduce the rotational twisting about the horizontal axis that might deform the squared shape of the I beam shaped level and/or straight edge 100. Similarly, the elongated bar 105 is shown as an open section that may take on any shape, for example, a C shape.

Figure 7:
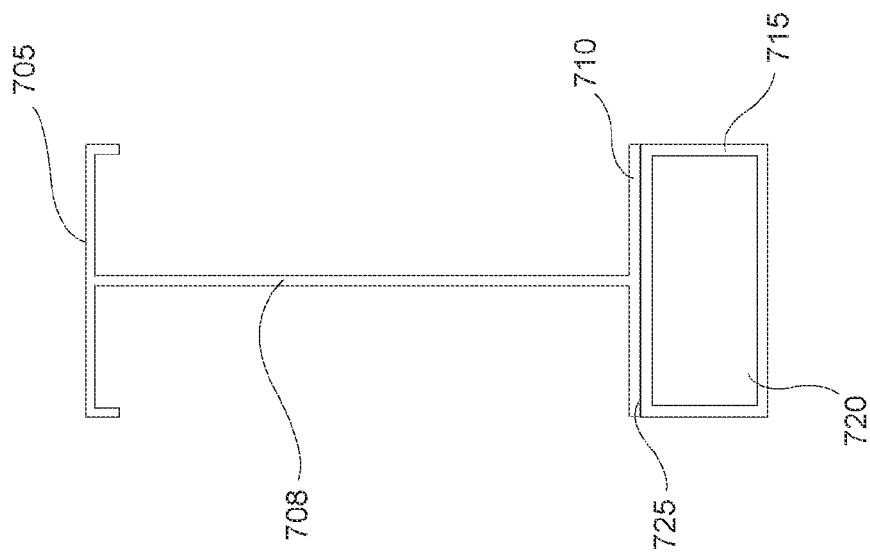
FIG. 7 illustrates a cross-section view (or end view without end caps) of the level and/or straight edge, according to at least one other exemplary embodiment of the invention.

Referring now to FIG. 7, the cross-section view (or end view without end caps) of at least one other embodiment for the level and/or straight edge is shown. In this example, a top bar 705 and bottom bar 710 may be formed parallel to one another and perpendicular with a main frame side or bar 708. The structure may be integrally formed. A closed bar or box structure 715 may be formed separately and may have a hollow area 720. The closed bar or box structure 715 may be formed separately and may be made of a different or the same materials as the I shaped structure. Although not shown, the hollow area 720 may include one or more support walls similar to those shown in FIG. 5. In any case, the box structure 715 may be connected to the bottom bar 710 at surface 725 using any reasonable method, for example, adhesive, welding, brazing, soldering, etc. In some cases, the method of connecting the two separate structures may add more strength and/or rigidity.

Figure 8:
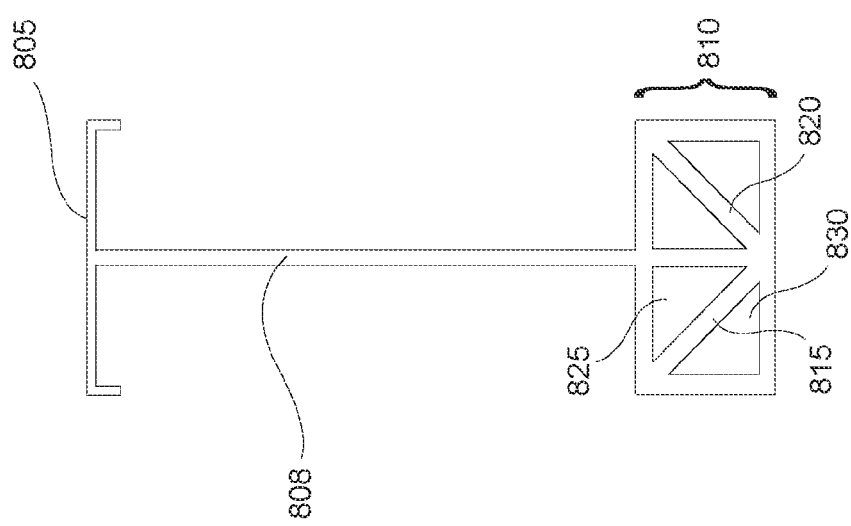
FIG. 8 illustrates a cross-section view (or end view without end caps) of the level and/or straight edge, according to at least one other exemplary embodiment of the invention.

Referring now to FIG. 8, the cross-section view (or end view without end caps) of at least one other embodiment for the level and/or straight edge is shown. In this example, a top bar 805 and bottom closed structure or box 810 may be formed perpendicular to and integral with a main frame side or bar 808. The closed bar or box structure 810 may have one or more support walls and hollow areas. For example, there may be diagonal support walls 815 and 820, as well as voids 815 and 825. This structure may have improved strength and rigidity while being lightweight.

Figure 9:
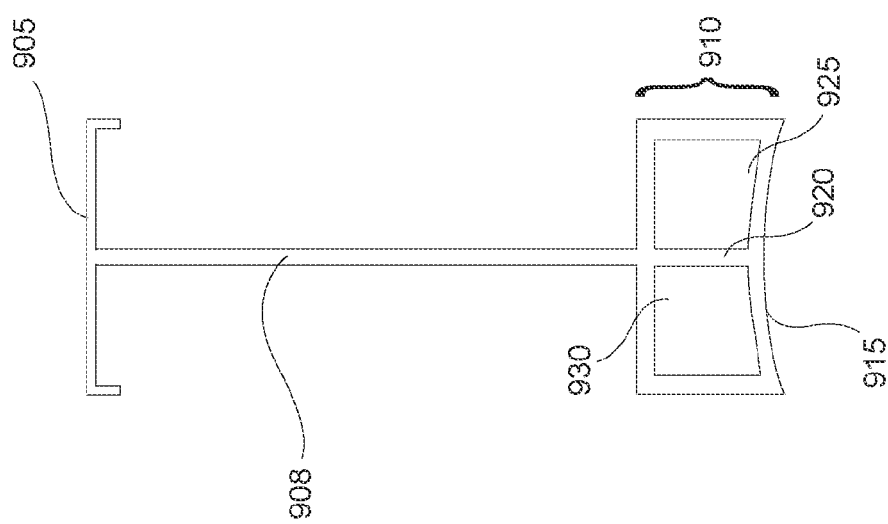
FIG. 9 illustrates a cross-section view (or end view without end caps) of the level and/or straight edge, according to at least one other exemplary embodiment of the invention.

Referring now to FIG. 9, the cross-section view (or end view without end caps) of at least one other embodiment for the level and/or straight edge is shown. In this example, a top bar 905 and bottom closed structure or box 910 may be formed perpendicular to and integral with a main frame side or bar 908. The closed bar or box structure 910 may have one or more support walls 910 and hollow areas 925 and 930. Further, the bottom wall 915 of the closed structure 910 may be formed in a concave manner. This level and/or straight edge design may be particularly advantageous for leveling pipes or other items having a rounded surface.

Figure 10:
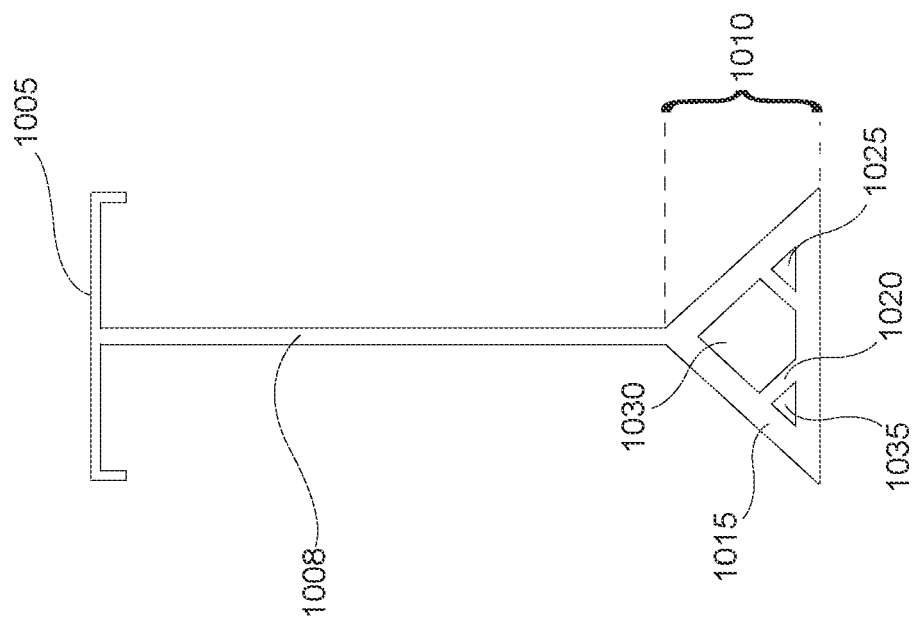
FIG. 10 illustrates a cross-section view (or end view without end caps) of the level and/or straight edge, according to at least one other exemplary embodiment of the invention.

Referring now to FIG. 10, the cross-section view (or end view without end caps) of at least one other embodiment for the level and/or straight edge is shown. In this example, a top bar 1005 and bottom closed structure or box 1010 may be formed perpendicular to and integral with a main frame side or bar 1008. The closed bar or box structure 1010 may be formed in the shape of a triangle having sloped sides, e.g., side 1015. The closed bar or box structure 1010 may have one or more support walls 1020 and hollow areas 1025, 1030 and 1035. This design enables a strong rigid lightweight structure that has sloped surfaces upon which, for example, a scale may be more easily seen and read.

Figure 11:
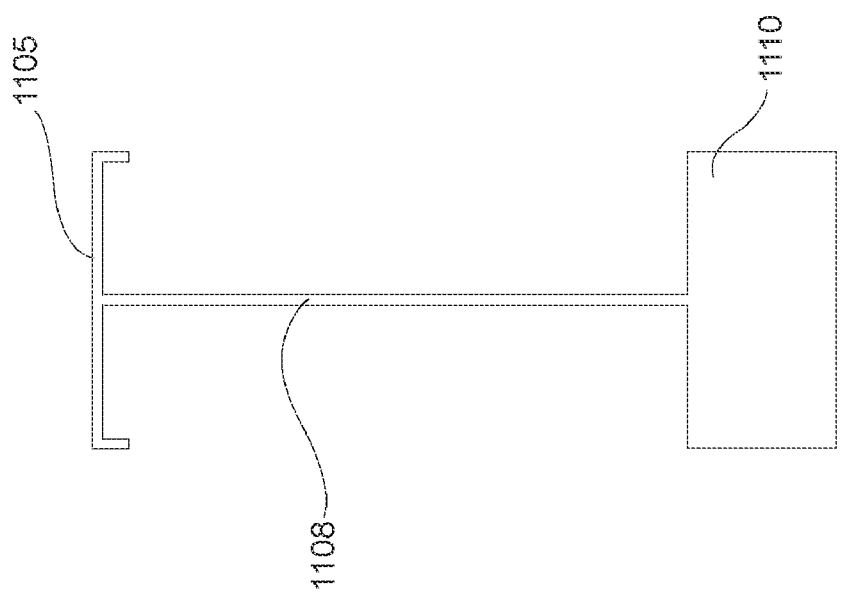
FIG. 11 illustrates a cross-section view (or end view without end caps) of the level and/or straight edge, according to at least one other exemplary embodiment of the invention.

Referring now to FIG. 11, the cross-section view (or end view without end caps) of at least one other embodiment for the level and/or straight edge is shown. In this example, a top bar 1105 and bottom structure or box 1110 may be formed perpendicular to and integral with a main frame side or bar 1108. The bottom bar or box structure 1110 may be a larger solid section that may be stronger and more rigid than other designs. It may also add additional weighting to the bottom side of the level and/or straight edge so that it may be more easily set up on a working surface. Although, the solid bottom bar or box structure 1110 may be heavier.

Figure 12:
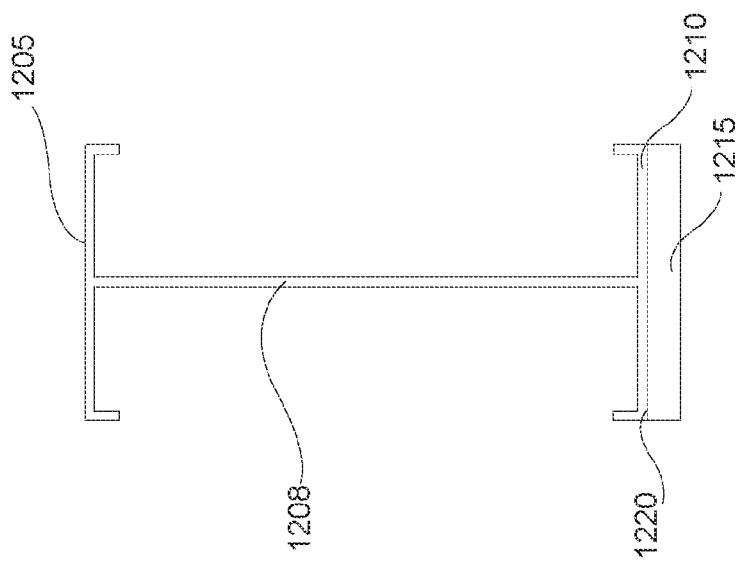
FIG. 12 illustrates a cross-section view (or end view without end caps) of the level and/or straight edge, according to at least one other exemplary embodiment of the invention.

Referring now to FIG. 12, the cross-section view (or end view without end caps) of at least one other embodiment for the I shaped level and/or straight edge is shown. In this example, a top bar 1205 and bottom bar 1210 may be formed parallel to one another and perpendicular with a main frame side or bar 1208. The structure may be integrally formed. In this embodiment, the bottom bar 1210 may also have ears that improve its strength and/or rigidity. A solid bar, plate or box structure 1215 may be formed separately and may be made of a different or the same materials as the I shaped structure. For example, some of the materials may include steel, stainless steel, aluminum, magnesium, plastic, wood, etc. In any case, the bar, plate or box structure 1215 may be connected to the bottom bar 1210 at surface 1220 using any reasonable method, for example, adhesive, welding, brazing, soldering, etc. In some cases, the method of connecting the two separate structures may add more strength and/or rigidity, while still being relatively lightweight.

Referring to FIGS. 13A-13F, those skilled in the art can see, that the premises of this invention is that the full range of embodiments encompasses a structure with at least one closed section for the construction of a level/straight edge. FIGS. 13A-13F show various exemplary cross-sections (or end view without end caps) for a level/straight edge, showing a variety of geometry features including non I shaped structures (e.g., b, T, P, g, etc.), non rectangular and irregular shaped features, non-uniform wall thicknesses, and multiple closed structures. In particular, FIG. 13A shows a cross-section (or end view without end caps) having a larger closed end comprised of sides 1305A, 1306, 1307 and 1308 and a short open end 1305B. Note that in this embodiment the configuration is not an I shape, but is rather a "b" shape or upside down P shape. FIG. 13B shows a cross-section (or end view without end caps) having an open end comprising side 1310 and a moderately sized closed end comprised of sides 1312, 1313, 1314, and a portion of 1311. In this case it is worth noting that the side 1311 that connects the open end and closed end is not in the center but is on one side of the structure, thus forming an upside down "g" shape or a block "6" shape. FIG. 13C shows a cross-section (or end view without end caps) having an open end comprising side 1324 and a closed end comprising sides 1320, 1321, 1322, and 1323. In this example, the open end is formed at an angel, for example 30 degrees (or 45 degrees) from the closed end side 1323. Further, the side 1320 may be made generally thicker than the other sides and may have a wider portion near side 1324, which may offer better support and rigidity to side 1324.

FIGS. 13D and 13E show a cross-section views (or end views without end caps) for the level and/or straight edge having two closed ends. FIG. 13D has a first closed end including sides 1336, 1337, 1338, and 1339. Note that side 1339 may be thicker than the other sides for improved strength and may be made at an angle for ease of reading a scale (made longitudinally along the level and/or straight edge. FIG. 13D also has a second closed comprising sides 1330, 1331, 1332, 1333, 1334, and a portion of 1335. This closed end has an irregular geometry. The two closed ends of this embodiment is connected by side 1335. FIG. 13E includes a first closed end comprising sides 1340, 1341, 1342, and 1343 and a second closed end comprised of sides 1345, 1346, 1347, and 1348. The second closed end may also include strengthening inner ribs 1349 and 1350. The two closed ends are connected together by side 1344, and together form a barbell or I shape with enclosed ends.

FIG. 13F shows a cross-section (or end view without end caps) having an upside down "T" shape with a closed end connected to an open end by an enclosed connecting portion. In this example, the closed end is comprised of sides 1353, 1354, 1355, and 1356. This closed end is connected to the open end 1351 by connection sides 1350 and 1352. It is also possible that open end 1351 may be elongated so as to form an I shape as in other embodiments. In any case, what can be seen from these examples is that many there are many variations possible for the present invention.

Although a particular embodiment(s) of the present invention has been shown and described, it will be understood that it is not intended to limit the invention to the preferred embodiment(s) and it will be obvious to those skilled in the art that various changes and modifications may be made without departing from the spirit and scope of the present invention. Thus, the invention is intended to cover alternatives, modifications, and equivalents, which may be included within the spirit and scope of the invention as defined by the claims.

All publications, patents, and patent applications cited herein are hereby incorporated by reference in their entirety for all purposes

The invention claimed is:

1. An apparatus, comprising:
a level and/or straight edge hand-held building tool having two opposing, lengthwise ends, where one end is a higher strength member(s) to augment the rigidity of the level and/or straight edge hand-held building tool, and the other is a lower strength member(s).

2. The apparatus of claim 1, wherein the higher strength member(s) is an at least partially closed structure.

3. The apparatus of claim 2, wherein the at least partially closed structure has a hollow cross-section structure.

4. The apparatus of claim 3, wherein the hollow structure contains at least one stabilization device(s).

5. The apparatus of claim 2, wherein the at least partially closed structure includes at least a portion that is a solid structure.

6. The apparatus of claim 1, wherein the higher strength member and the at least one other member are approximately parallel.

7. The apparatus of claim 6, wherein the approximately parallel members are approximately the same maximum width.

8. The apparatus of claim 1, wherein a connecting member connects the at least two opposing lengthwise ends and is approximately perpendicular to at least one of the lengthwise ends and includes two sides that are approximately parallel with one another so as to form a rectangular shape with at least a portion of each of two opposing lengthwise ends, and wherein the higher strength member(s) lengthwise end is an at least partially closed structure having a hollow cross-section structure.

9. The apparatus of claim 1, wherein the level and/or straight edge hand-held building tool has at least two higher strength member(s) each having an at least partially closed shape.

10. An apparatus, comprising:
an elongated straight edge hand-held building tool structure having a cross section shape perpendicular to the elongated direction with an open section member and a closed section member opposing one another, wherein the closed section member increases rigidity of the straight edge hand-held building tool structure.

11. The apparatus of claim 10, wherein a section of the elongated straight edge is partially closed along a lengthwise axis.

12. The apparatus of claim 11, wherein the closed section member contains one or more strengthening members included within an internal area cavity of the closed section.

13. The apparatus of claim 12, wherein the strengthening members are parallel to one or more walls of the closed section member.

14. The apparatus of claim 13, wherein the cross section of the straight edge hand-held building tool structure has an approximately I shape form.

15. The apparatus of claim 14, further comprising:
a connecting member that connects the open section member to the closed section member and is approximately perpendicular to at least one surface of the open section member and the closed section member to which it connects.

16. The apparatus of claim 15, wherein the open section member, the closed section member, and the connecting member are formed at the same time by extrusion.

17. The apparatus of claim 16, further comprising: a scale formed along at least one side of the closed section rx ember.

18. A level and/or straight edge tool, comprising:
a top elongated bar;
a main frame side; and
a closed structure, wherein the closed structure increases the rigidity of the level and/or straight edge tool.

19. The level and/or straight edge of claim 18, wherein the top elongated bar, the main frame side, and the closed structure form an I beam shaped structure that are formed integrally together by extrusion.

20. The level and/or straight edge of claim 19, further comprising: one or more member(s) formed within the closed structure.

* * * * *